(12) United States Patent
Ikeda et al.

(10) Patent No.: US 7,392,854 B2
(45) Date of Patent: Jul. 1, 2008

(54) FRONT ROTARY WORKING MACHINE

(75) Inventors: Takashi Ikeda, Wako (JP); Takayuki Satou, Wako (JP); Keiji Nagano, Wako (JP)

(73) Assignee: Honda Motor Co., Ltd. (JP)

( * ) Notice: Subject to any disclaimer, the term of this patent is extended or adjusted under 35 U.S.C. 154(b) by 286 days.

(21) Appl. No.: 11/208,828

(22) Filed: Aug. 22, 2005

(65) Prior Publication Data
US 2006/0037763 A1    Feb. 23, 2006

(30) Foreign Application Priority Data
Aug. 23, 2004    (JP)    ............ 2004-242286

(51) Int. Cl.
*A01B 33/00*    (2006.01)
(52) U.S. Cl. .................. 172/43; 172/354; 172/676
(58) Field of Classification Search ............. 172/35, 172/40, 42, 329, 351, 354, 669, 674, 676
See application file for complete search history.

(56) References Cited

U.S. PATENT DOCUMENTS

| | | | | | |
|---|---|---|---|---|---|
| 2,661,584 | A | * | 12/1953 | Ronning | ............ 56/501 |
| 2,871,585 | A | * | 2/1959 | Merry et al. | ............ 37/243 |
| 3,016,957 | A | * | 1/1962 | Olson | ............ 172/42 |
| 3,168,148 | A | * | 2/1965 | Marcoux | ............ 172/42 |
| 3,685,469 | A | * | 8/1972 | Rogers | ............ 111/158 |
| 4,336,760 | A | * | 6/1982 | Cohen et al. | ............ 111/131 |
| 4,923,016 | A | * | 5/1990 | Moise | ............ 172/21 |
| 4,939,892 | A | * | 7/1990 | Kawasaki | ............ 56/11.1 |
| 4,974,403 | A | * | 12/1990 | Fukui et al. | ............ 56/202 |
| 5,020,310 | A | * | 6/1991 | Oshima et al. | ............ 56/17.2 |
| 6,347,593 | B1 | * | 2/2002 | Moran et al. | ............ 111/133 |
| 6,434,918 | B1 | * | 8/2002 | Csonka et al. | ............ 56/13.4 |
| 6,644,416 | B2 | * | 11/2003 | Teeple | ............ 172/42 |
| 6,854,526 | B2 | * | 2/2005 | Yamazaki et al. | ............ 172/42 |
| 6,860,334 | B2 | * | 3/2005 | Yamazaki et al. | ............ 172/42 |

FOREIGN PATENT DOCUMENTS

JP    10225202    8/1998

* cited by examiner

*Primary Examiner*—Thomas B Will
*Assistant Examiner*—Joel F Mitchell
(74) *Attorney, Agent, or Firm*—Adams & Wilks

(57) ABSTRACT

A front rotary working machine is provided which has rotary working portions disposed at a front portion of a transmission case, and a front wheel disposed forward of the rotary working portions. The working machine includes a guard member extending forward from the transmission case for guarding an upper side of the rotary working portions. A support device for supporting the front wheel is connected to the front portion of the transmission case. The support device has an upper portion connected to the guard member. A load applied from the front wheel to the support device is distributed to the transmission case and the guard member, resulting in strengthening of the support device.

9 Claims, 10 Drawing Sheets

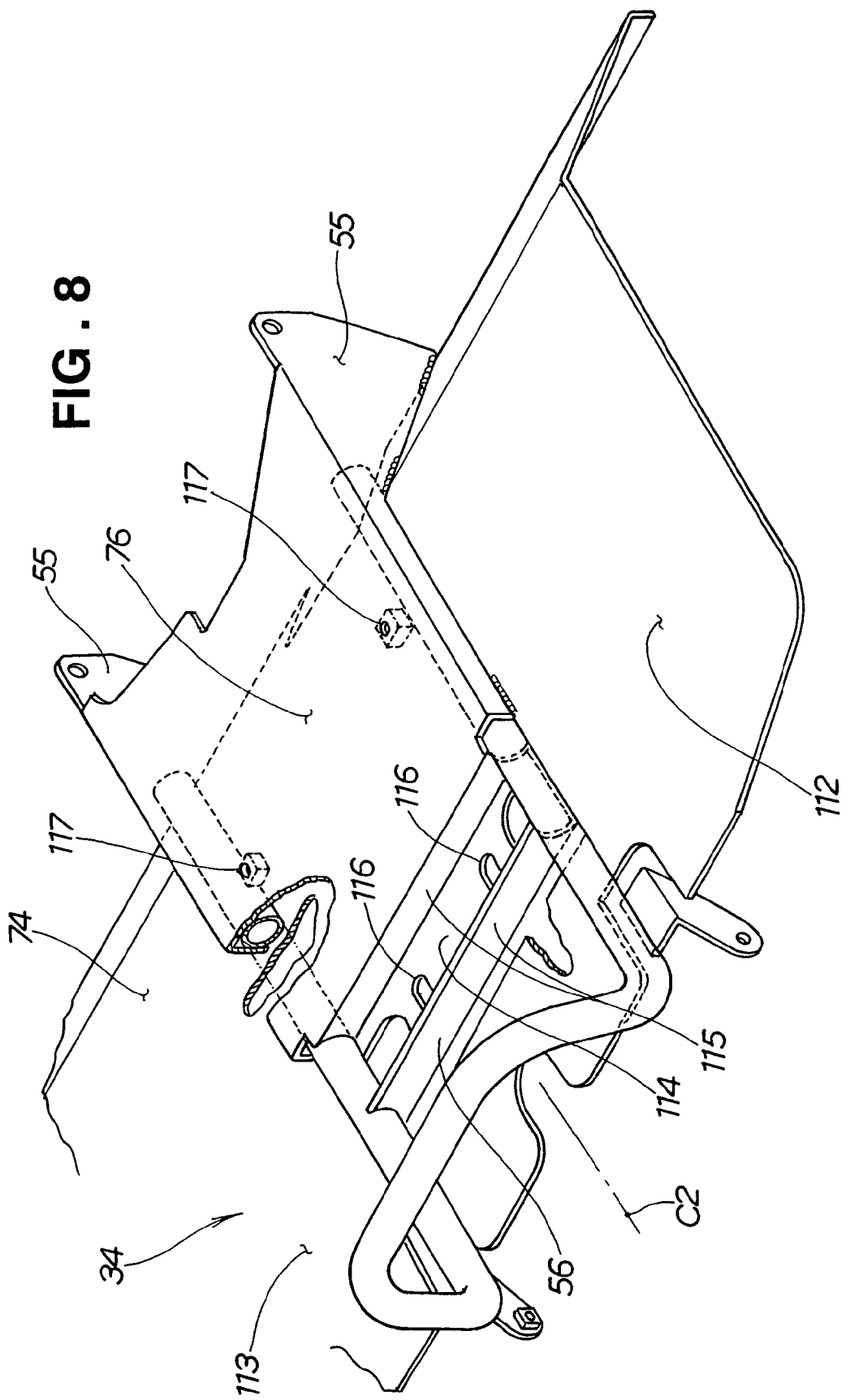

US 7,392,854 B2

FRONT ROTARY WORKING MACHINE

FIELD OF THE INVENTION

The present invention relates to front rotary working machines with a rotary working portion disposed at the front of a transmission case, and a front wheel disposed forward of the rotary working portion.

BACKGROUND OF THE INVENTION

A walk-behind working machine with a front wheel disposed in front of a rotary working portion is disclosed, for example, in Japanese Patent Laid-Open Publication No. HEI-10-225202. This walk-behind working machine will be described with reference to FIG. 10 hereof.

A walk-behind working machine 201 in the related art shown in FIG. 10 includes a drive case 203 (including a transmission case 204 and a rotary case 205) disposed at the lower part of a machine body 202, a rotary shaft 206 of a rotary device provided at the rotary case 205, a wheel support arm 208 mounted to right and left plates of the machine body 202 by a pivot 207, a front liftable wheel 209 mounted to the distal end of the wheel support arm 208, and a lifting and lowering adjustment lever 211 connected to the wheel support arm 208. The height of the front liftable wheel 209 is adjusted by operating the lifting and lowering adjustment lever 211.

This walk-behind working machine 201, however, has a possibility that when a large load is applied to the wheel support arm 208, the right and left plates supporting the wheel support arm 208 can be deformed. It is desirable especially for large-size farm working machines that a support structure of a wheel support arm be increased in strength without losing the lightness, that is, a support device for supporting a front wheel be strengthened.

SUMMARY OF THE INVENTION

The present invention provides a front rotary working machine which comprises an engine; a transmission case mounted to a lower portion of the engine; rotary working portions disposed at a front portion of the transmission case; a guard member extending forward from the transmission case for guarding an upper side of the rotary working portions; and a support device connected to the front portion of the transmission case for supporting a front wheel disposed forward of the rotary working portions, and having an upper portion connected to the guard member.

With this working machine, when a load is applied from the front wheel to the support device, the load is transmitted to the transmission case and simultaneously transmitted from the upper portion of the support device to the guard member, thus being distributed. As compared to a structure of supporting that to the transmission case at a single point, the strength of the support device supporting the front wheel is increased, and elastic deformation of the support device supporting the front wheel is prevented. Thus, the lifted or lowered height of the front wheel is stabilized, and the exact plowing depth can be obtained.

The support device preferably includes a front wheel support arm member supporting the front wheel at a distal end portion thereof, and a side plate member rotatably supporting the front wheel support arm member and having an opening at a connected portion to the transmission case. With this, dirt thrown up by the rotary working portions and then striking the guard member and falling can be gravitationally discharged from the opening, and is prevented from accumulating on the side plate member. This facilitates washing, inspection and maintenance of the support device.

BRIEF DESCRIPTION OF THE DRAWINGS

A preferred embodiment of the present invention will be described in detail below, by way of example only, with reference to the accompanying drawings, in which:

FIG. 8 is a perspective view of the guard member shown in FIG. 4;

DETAILED DESCRIPTION OF THE PREFERRED EMBODIMENT

An embodiment of the present invention will be described with a tiller illustrated as an example of a front rotary working machine.

Figure 1:
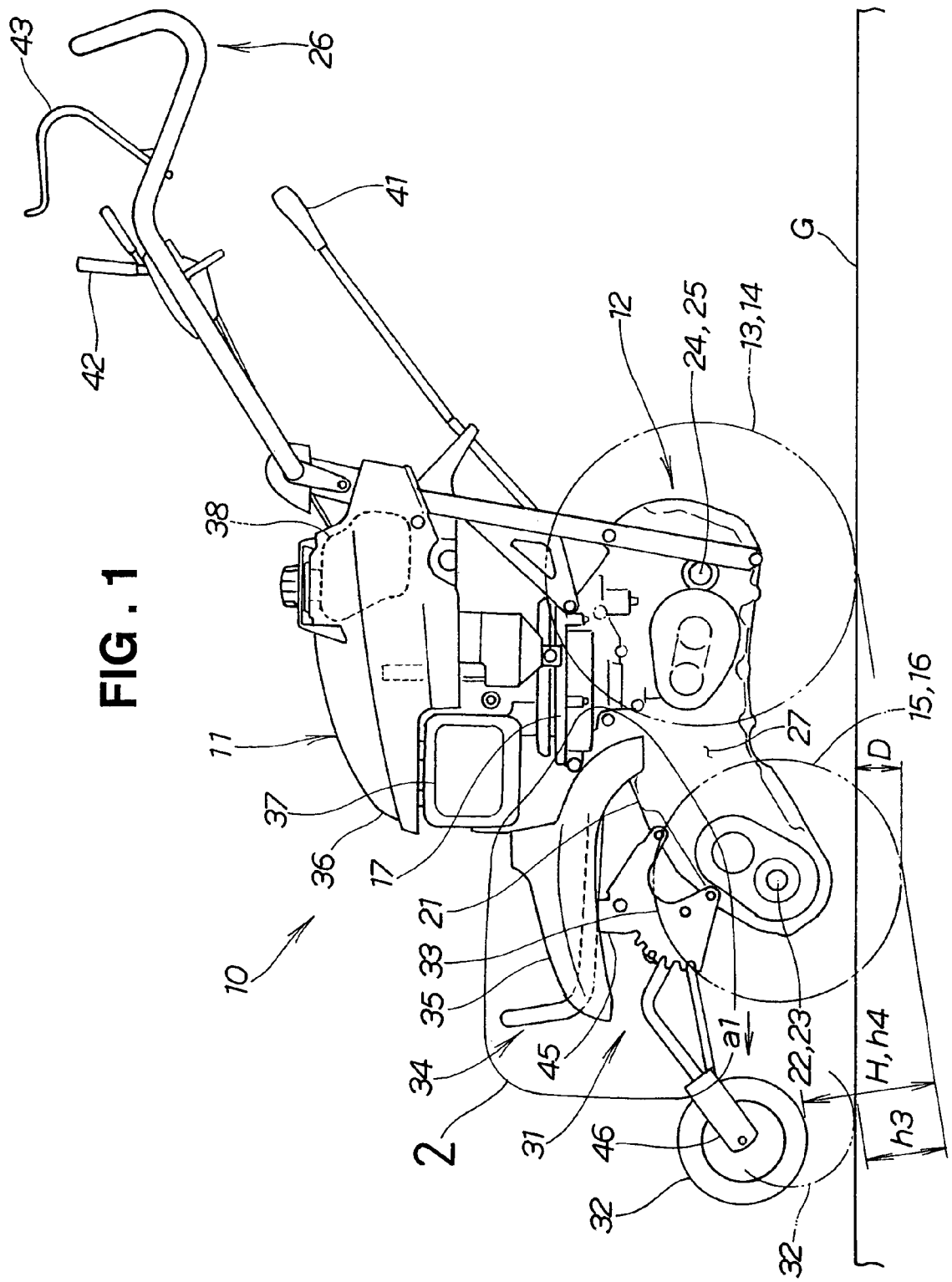
FIG. 1 is a side view of a tiller as an example of a front rotary working machine in the present invention.

A front rotary working machine (tiller) 10 in this embodiment shown in FIG. 1 is an agricultural machine configured to transmit power from an engine 11 through a power transmission 12 to left and right drive wheels 13 and 14, and left and right rotary working portions 15 and 16 disposed forward of the drive wheels 13 and 14. With the rotary working portions 15 and 16, an agricultural field is plowed.

The front rotary working machine 10 includes the power transmission 12 mounted to the bottom of the engine 11 via a clutch 17, the rotary working portions 15 and 16 rotatably mounted to a front portion 21 of the power transmission 12 via left and right working drive shafts 22 and 23, the drive wheels 13 and 14 rotatably mounted to a rear portion of the power transmission 12 via left and right axles 24 and 25, and a handle 26 extended from a rear portion of the power transmission 12 rearward and obliquely upward. Reference numeral 27 denotes a transmission case; D, the depth of plowing; and G, a traveling surface.

In the front rotary working machine 10, the rotary working portions 15 and 16 are disposed at the front portion 21 of the transmission case 27; a front wheel (travel auxiliary wheel) 32 is mounted to the front portion 21 via a support device 31 and disposed forward of the rotary working portions 15 and 16 (in the direction of arrow a1); and a guard member 34 extends forward as shown by arrow a1 from the transmission case 27 so as to guard an upper side 33 of the rotary working portions 15 and 16.

Reference numeral 35 denotes a fender covering the upper side of the power transmission 12 and the rotary working portions 15 and 16. Reference numeral 36 denotes an engine cover covering the upper side of the engine 11; 37, an air cleaner; 38, a fuel tank; 41, a shift lever; 42, a differential lock lever; and 43, a clutch lever.

The support device 31 is intended to support the front wheel 32 and to set the lifted or lowered height H of the front wheel 32. Here, the lifted or lowered height H of the front wheel 32 is set at h4. The plowing depth D naturally changes with a change in the lifted or lowered height H of the front wheel 32.

The front wheel 32 is a travel means of the front rotary working machine 10 when not working, and also is a means for setting the plowing depth D when working.

The plowing depth D shown in FIG. 1 is provided when the lifted or lowered height H of the front wheel 32 is set at h3 (shown in chain double-dashed lines).

Figure 2:
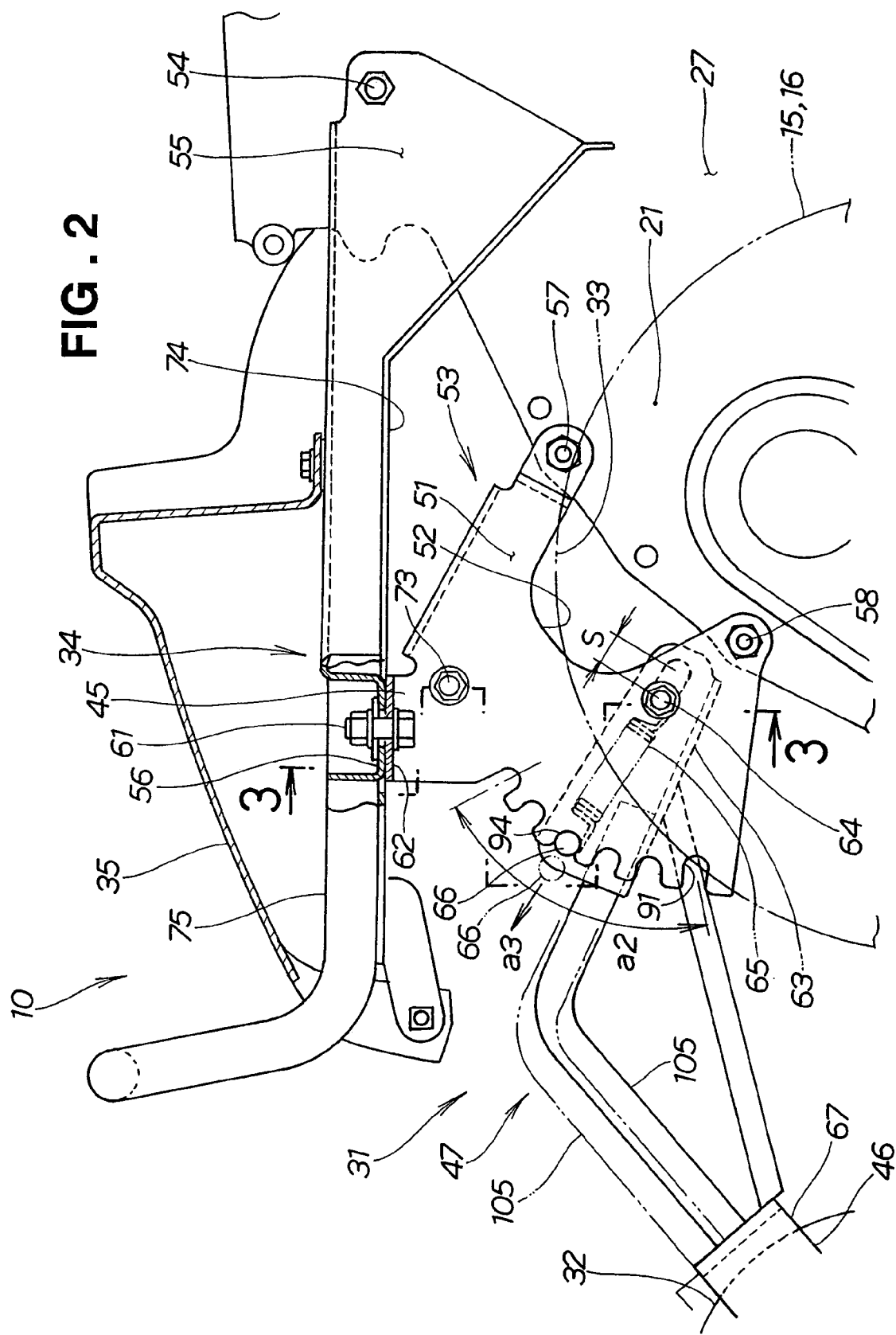
FIG. 2 is an enlarged view of portion 2 in FIG. 1, showing a support device partly in cross section.

FIG. 2 shows the support device 31 shown in FIG. 1.

The support device 31 is configured to be connected at an upper portion 45 thereof to the guard member 34, and includes a front wheel support arm member 47 having a distal end portion 46 supporting the front wheel 32, and a side plate member 53 supporting the front wheel support arm member 47 rotatably (in the directions of arrow a2) and having openings 52 at connected portions 51 to the transmission case 27.

The guard member 34 includes proximal portions 55 mounted to the transmission case 27 by bolts 54, and a connection portion 56 to which the side plate member 53 is connected. Details will be described below.

Figure 3:
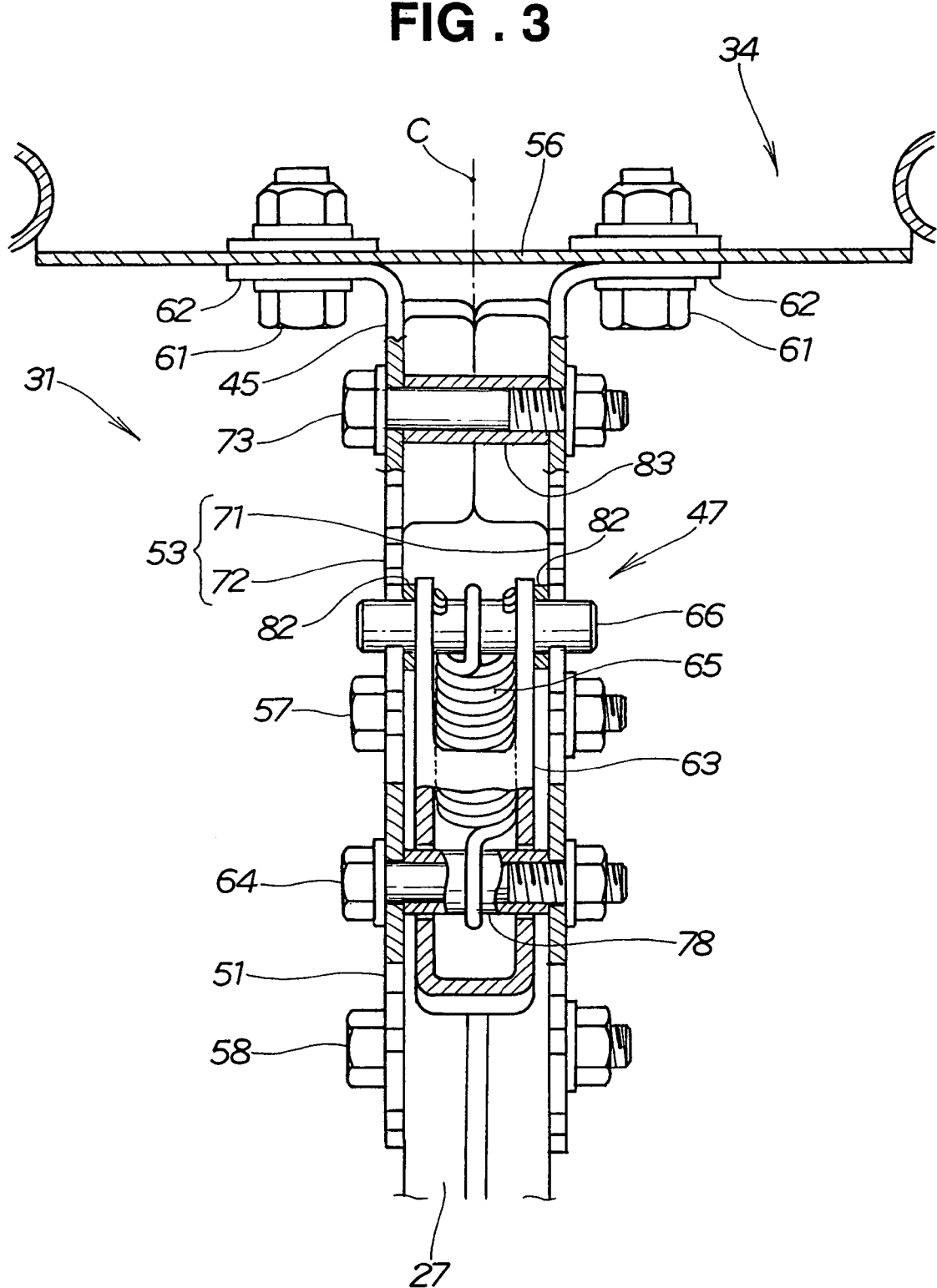
FIG. 3 is an enlarged cross-sectional view taken along line 3-3 of FIG. 2.

The side plate member 53 includes the connected portions 51 connected to the transmission case 27 by bolts 57 and 58, and flanges 62 attached to the connection portion 56 of the guard member 34 by bolts 61, 61 (see FIG. 3). Details will be described below.

The front wheel support arm member 47 includes a fitting portion 63 to which the side plate member 53 is fitted, a support member in the form of an axis bolt 64 supporting the fitting portion 63 and constituting the axis of rotation, a tension spring 65 hooked on the axis bolt 64, an engaging shaft 66, and a fork 67 to which the front wheel 32 is mounted, so as to slide a distance S as necessary. Details will be described below.

FIG. 3 shows a cross section of the support device 31.

The support device 31 is configured so that the side plate member 53 is mounted to the guard member 34 by the bolts 61, 61; the side plate member 53 is mounted to the transmission case 27 by the bolts 57 and 58; the fitting portion 63 of the front wheel support arm member 47 is supported by the axis bolt 64 on the side plate member 53; and one end of the tension spring 65 is hooked on the axis bolt 64, and the other end of the tension spring 65 is hooked on the engaging shaft 66.

The side plate member 53 includes a left plate member 71 and a right plate member 72. The left and right plate members 71 and 72 are further fastened together by a bolt 73.

Figure 4:
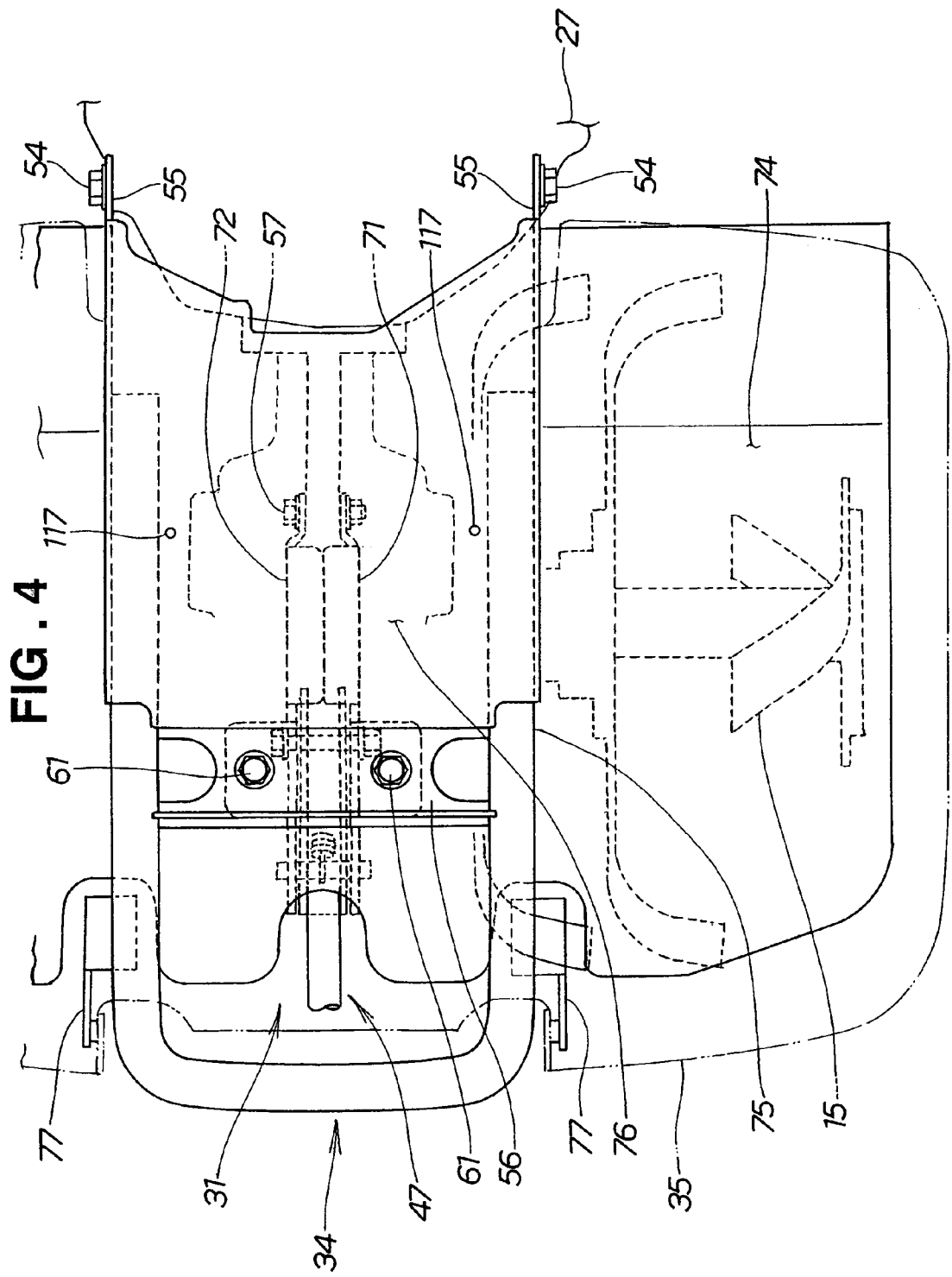
FIG. 4 is a plan view of a guard member shown in FIG. 2.

FIG. 4 is a plan view of the guard member 34 used in the front rotary working machine 10 of the present invention.

The guard member 34 includes the proximal portions 55, 55 mounted to the transmission case 27 by the bolts 54, 54, a dirt guide plate 74 attached to the proximal portions 55, a pipe member 75 attached to the dirt guide plate 74, the connection portion 56 attached to the pipe member 75, a reinforcing plate 76 formed continuously with the connection portion 56, and lugs 77, 77 supporting the mounting fender 35 (see FIG. 1) on the pipe member 75.

Figure 5:
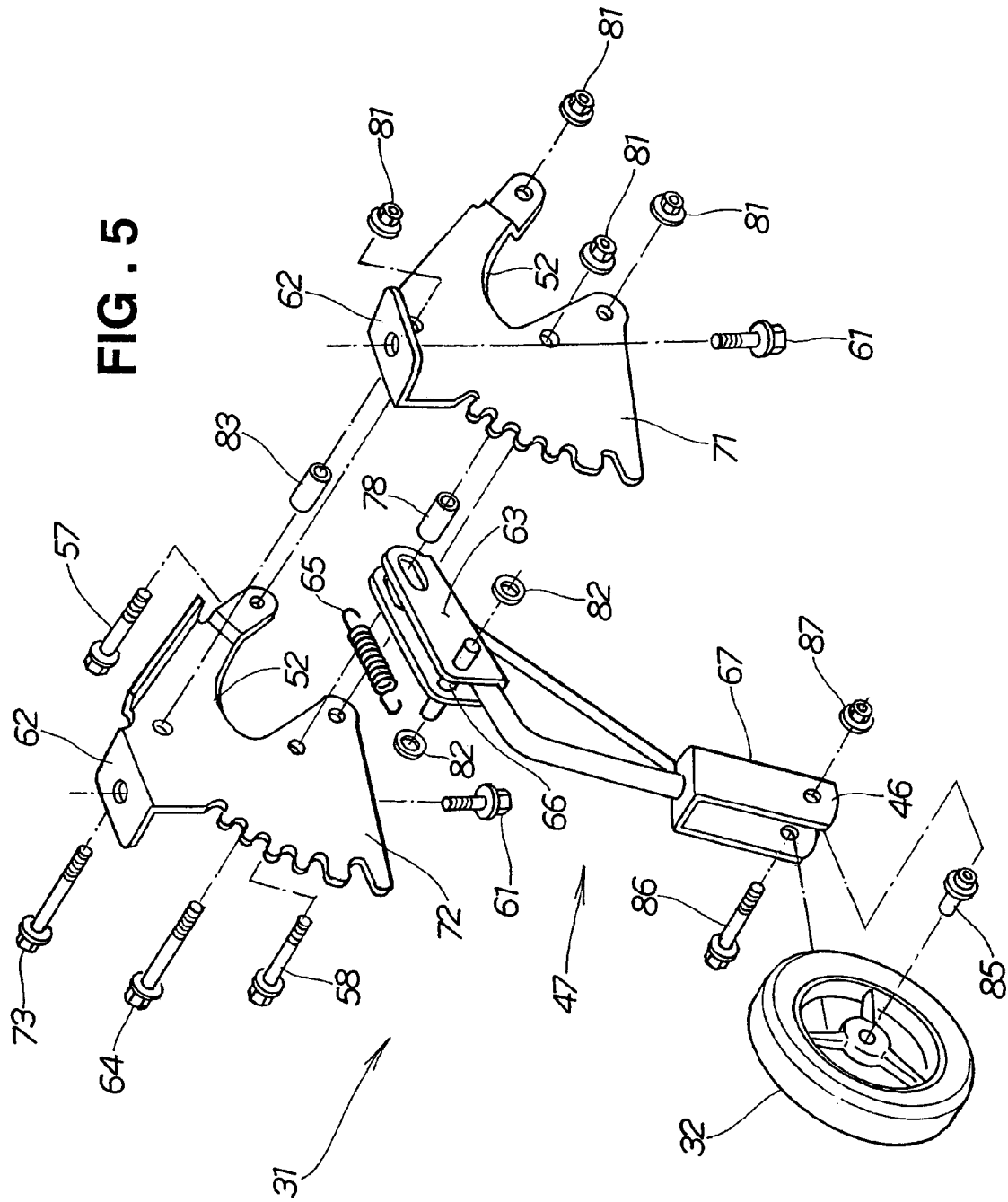
FIG. 5 is an exploded perspective view of the support device shown in FIG. 2.

FIG. 5 shows the support device 31 shown in FIG. 2 exploded in a perspective view. The way of assembling the support device 31 win be briefly described.

First, the axis bolt 64 is inserted through the right plate member 72; a first collar 78 is inserted through the fitting portion 63 of the front wheel support arm member 47; and the axis bolt 64 is inserted through the first collar 78. The tension spring 65 is hooked between the first collar 78 and the engaging shaft 66, and then the axis bolt 64 is inserted through the left plate member 71, and a nut 81 is screwed thereto about 80%. At that time, washers 82, 82 are mounted on the engaging shaft 66.

Second, the bolt 73 is inserted through the right plate member 72, a second collar 83, and the left plate member 71, and a nut 81 is screwed thereto about 80%.

Finally, the bolts 57 and 58 are inserted through the left and right plate members 71 and 72, and nuts 81, 81 are screwed thereto about 100%. The flanges 62, 62 are fastened to the connection portion 56 of the guard member 34 by the bolts 61, 61 as shown in FIG. 2.

The front wheel 32 is mounted to the fork 67 by a third collar 85, a bolt 86 and a nut 87. The front wheel 32 can be mounted to the fork 67 at any appropriate time.

Figure 6A:
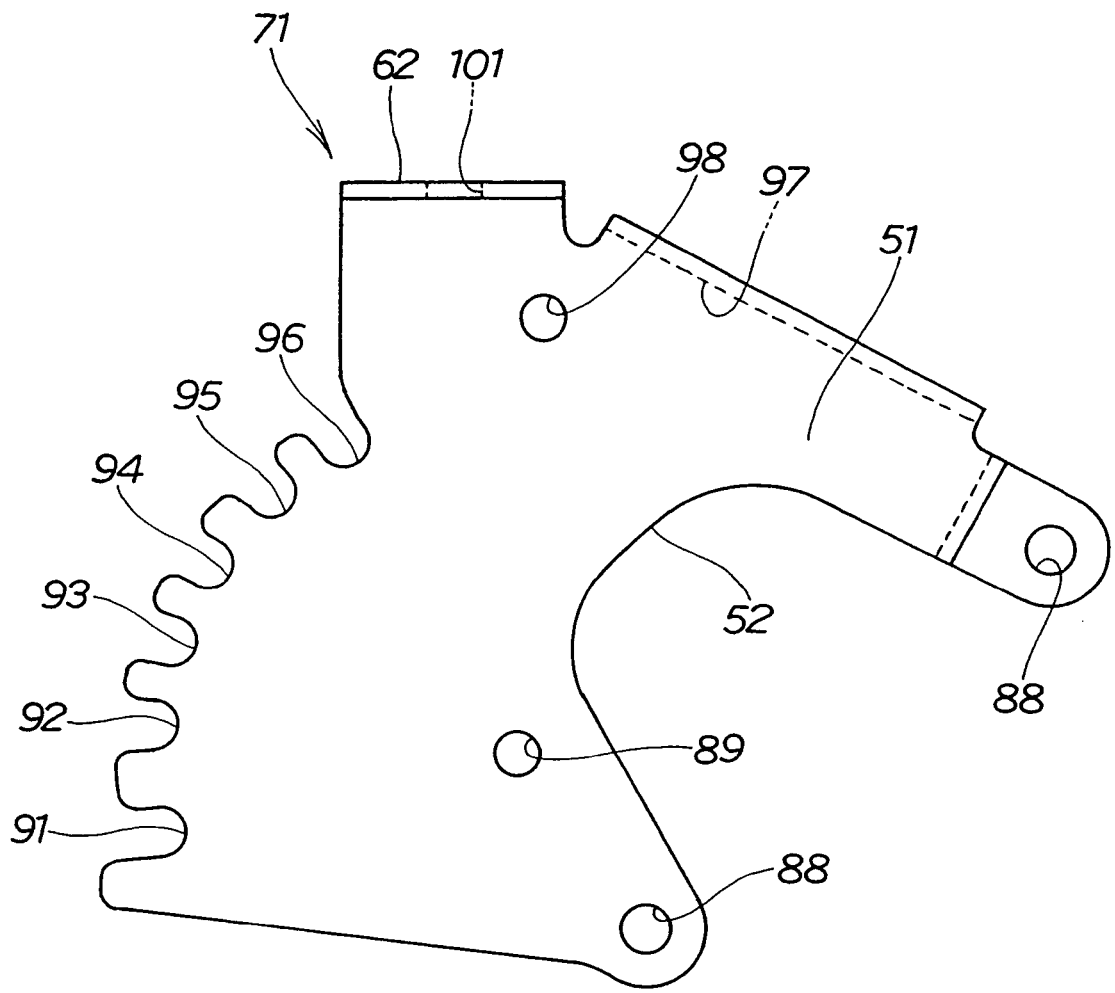
FIGS. 6A and 6B are diagrams showing a side plate member constituting a part of the support device shown in FIG. 5.
Figure 6B:
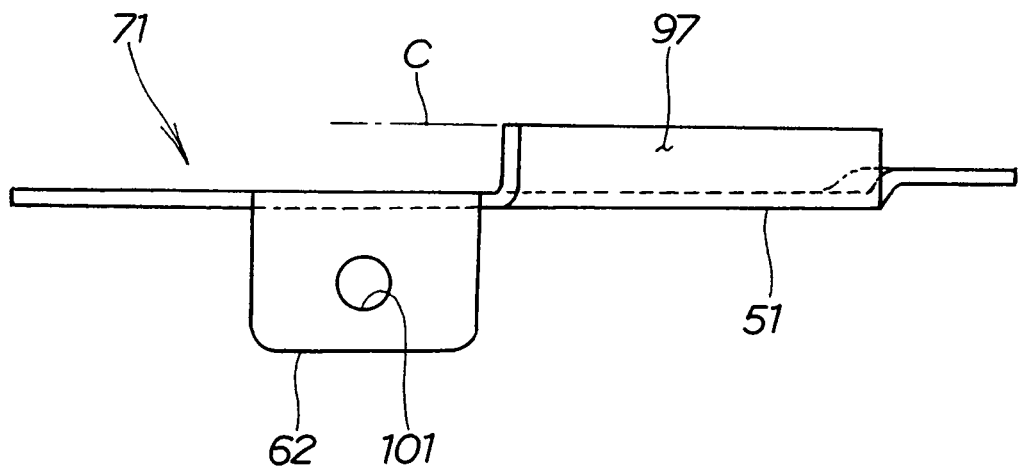

FIGS. 6A and 6B are an elevational view and a top view of the left plate member 71 shown in FIG. 5

The left plate member 71 includes the connected portion 51 formed in a forked shape formed with the opening 52, an axis hole 89 formed in the connected portion 51, first to sixth engaging depressed portions 91 to 96 formed in a wave shape at a front edge portion of the connected portion 51, the flange 62 formed at an upper portion of the connected portion 51, an abutting portion 97 formed at an upper edge portion rearward of the flange 62, and a mating hole 98 formed below the flange 62. The opening 52 is defined and bounded by a concave peripheral edge of the left plate member 71.

Mounting holes 88, 88 are formed in the connected portion 51 correspondingly to the transmission case 27 (see FIG. 2), and the mounting holes 88. 88 are located adjacent the concave peripheral edge of the opening 52.

The first to sixth engaging depressed portions 91 to 96 are a part for setting the lifted or lowered height of the front wheel 32 (see FIG. 1).

The right plate member 72 (see FIG. 5) is configured symmetrically with the left plate member 71 with respect to the central axis C as shown in FIG. 3, and will not be described.

Figure 7A:
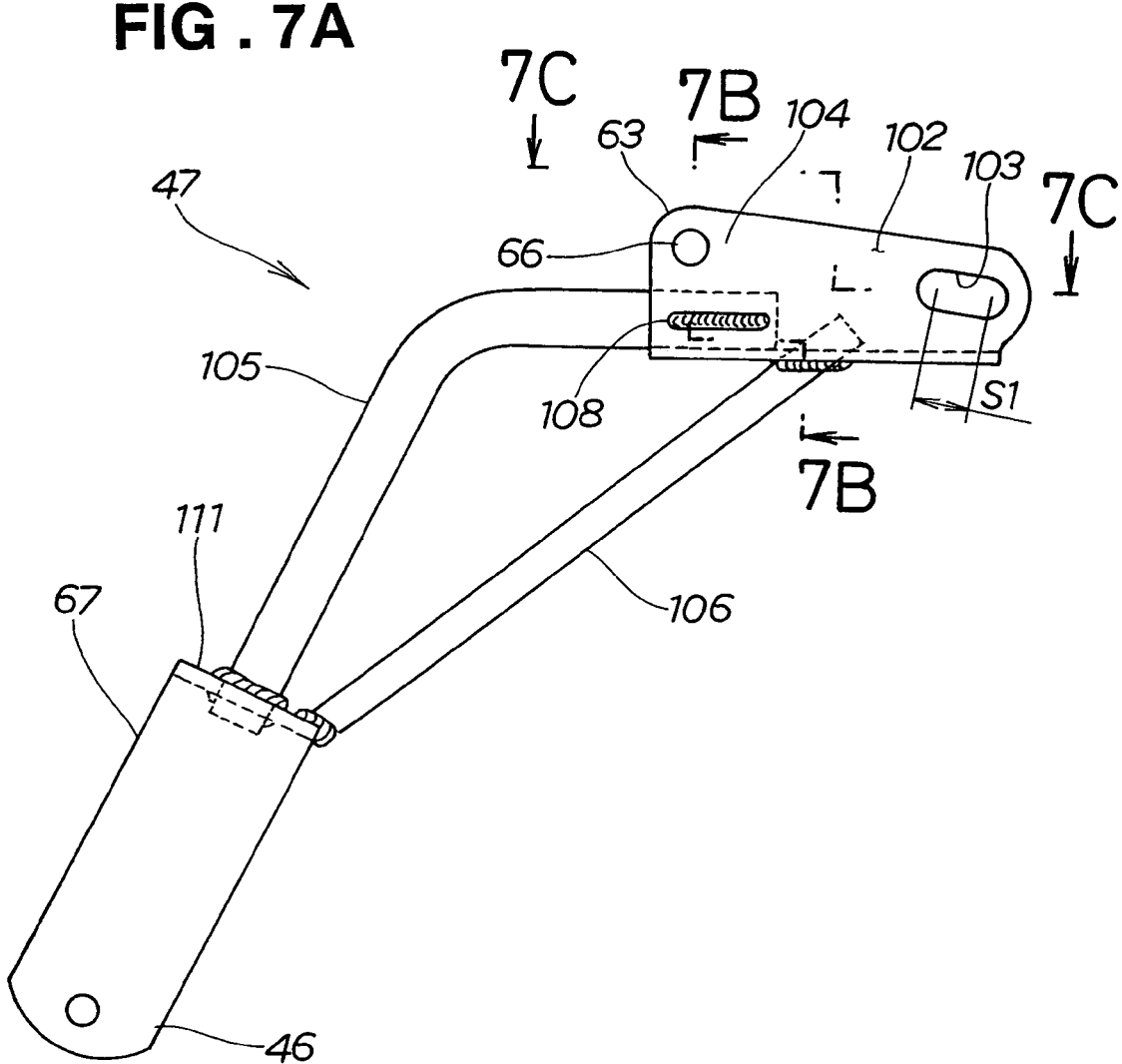
FIG. 7A is a diagram showing a front wheel support arm member shown in FIG. 5.
Figure 7B:
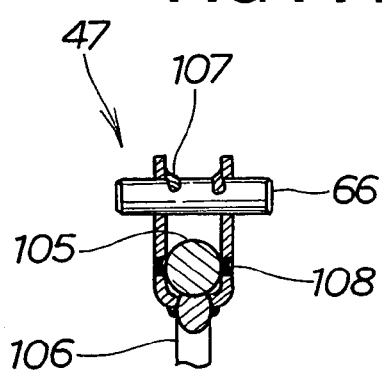
FIG. 7B is a cross-sectional view taken along line 7B-7B of FIG. 7A.

FIG. 7A shows the front wheel support arm member 47 shown in FIG. 5; FIG. 7B shows a cross section taken along line 7B-7B in FIG. 7A; and FIG. 7C shows a cross section taken along line 7C-7C in FIG. 7A.

Figure 7C:
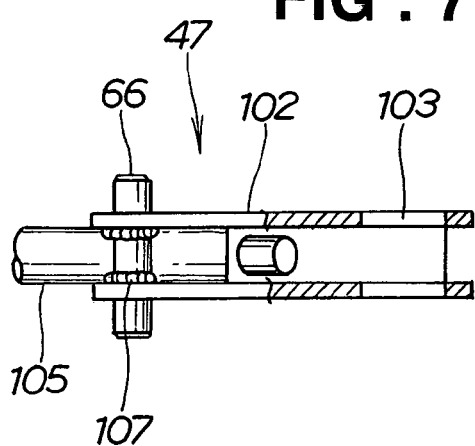
FIG. 7C is a cross-sectional view taken along line 7C-7C of FIG. 7A.
Figure 9:
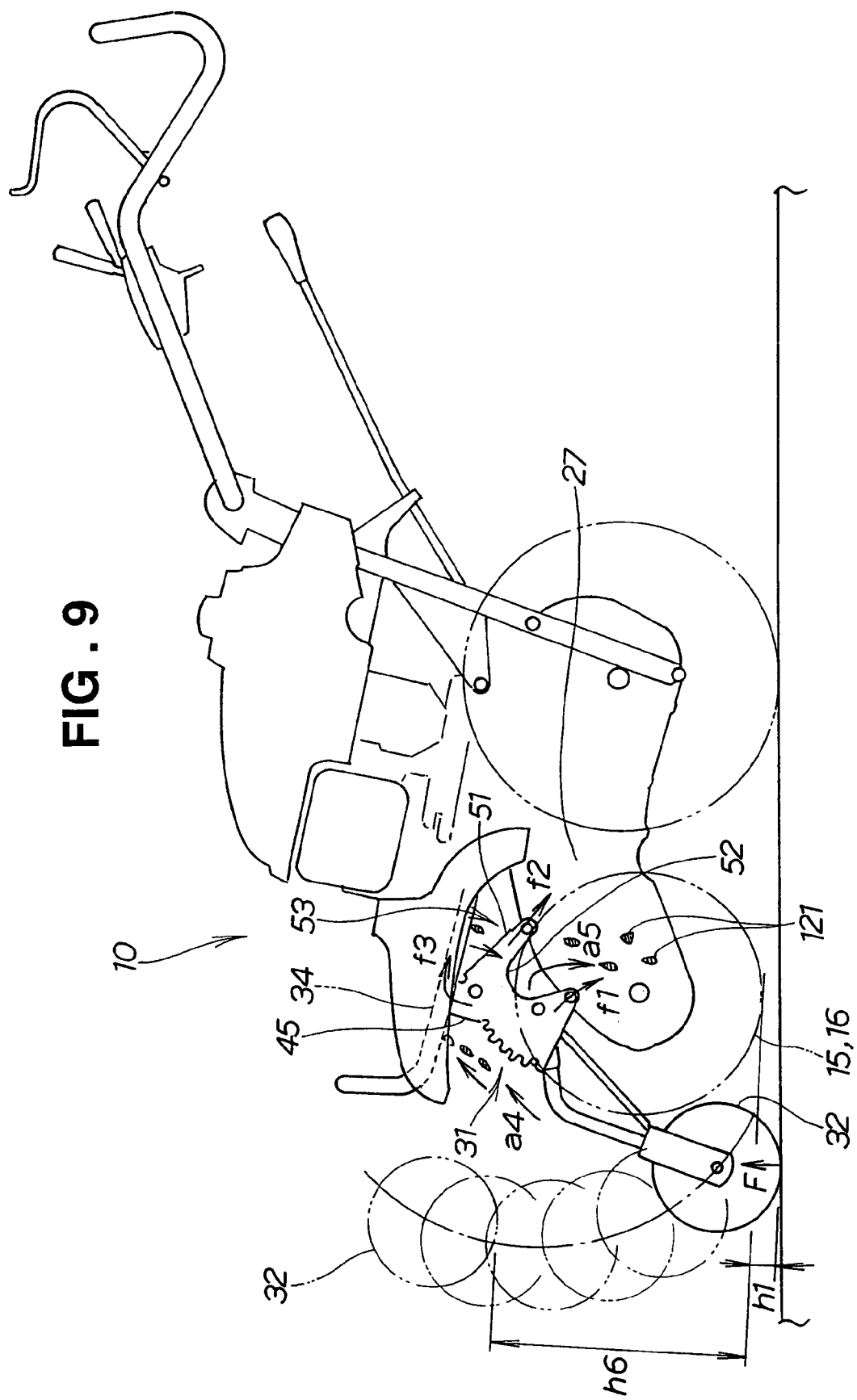
FIG. 9 is a diagram showing dirt being thrown up by a rotary working portion when the front rotary working machine in the present invention is being used.
Figure 10:
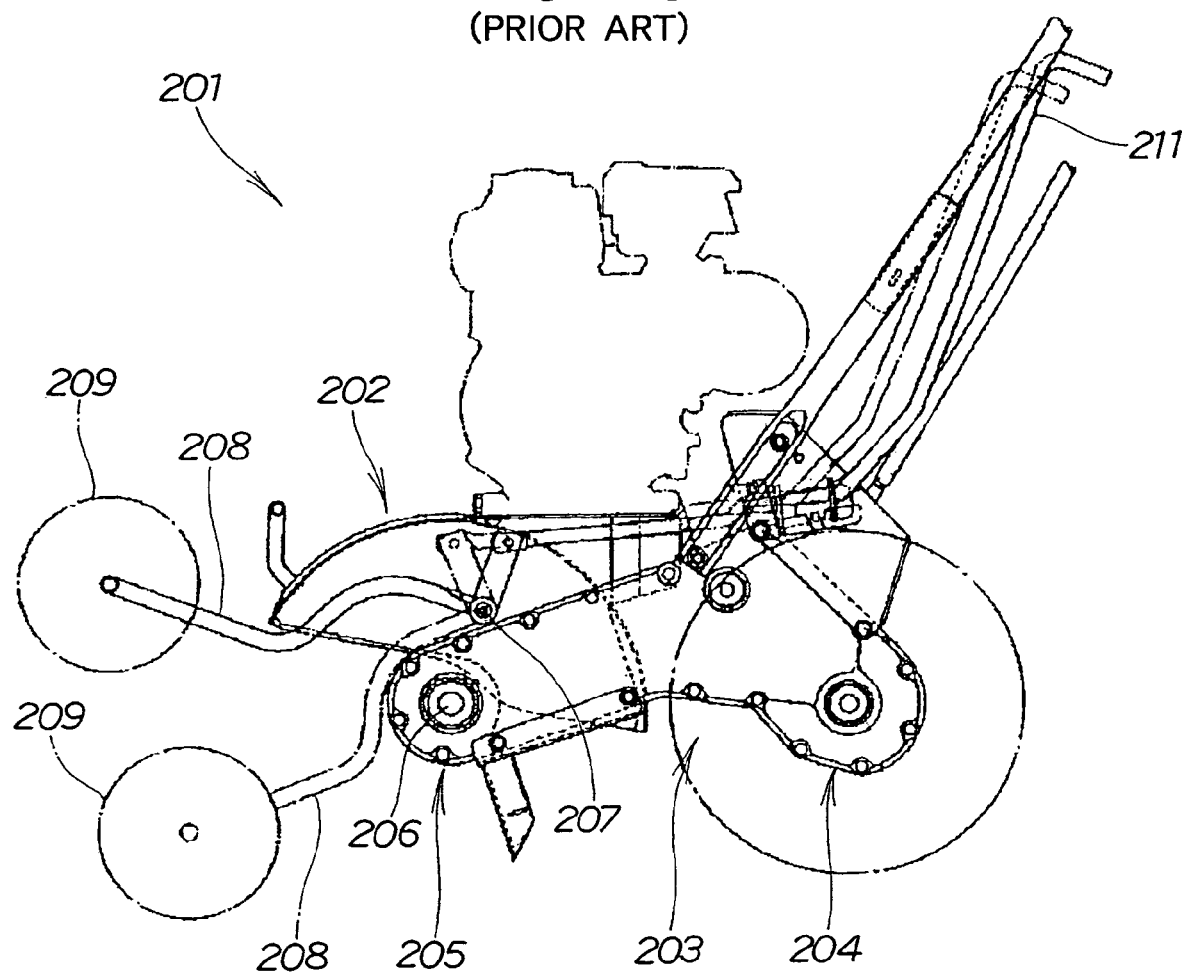
FIG. 10 is a schematic view of a walk-behind working machine in the related art.

Referring to FIGS. 7A to 7C, the front wheel support arm member 47 includes the fitting portion 63. The fitting portion 63 includes a rotary member 102 formed in a U-shaped cross section, a stroke hole 103 formed in a rear portion of the rotary member 102, and an engagement portion 104 formed in a front portion to which the engaging shaft 66 is mounted. A rear end portion of a dogleg first support member 105 is fixed by welding to a front portion of the rotary member 102. A rear end portion of a second support member 106 is fixed by welding to a middle portion of the rotary member 102.

Referring to FIG. 7B, reference numeral 107 denotes a first weld (such as a bead) fixing the engaging shaft 66; and 108, a second weld (such as a bead) fixing the rear end portion of the first support member 105.

The stroke hole 103 has a diameter greater than the outside diameter of the first collar 78 (see FIG. 5), and has a length set at S1 (S1=S).

The fork 67 includes a fixed portion 111 fixed by welding to the first support member 105 and the second support member 106.

Now, with reference to FIG. 2, the way of setting the lifted or lowered height of the front wheel 32 will be described.

Referring to FIG. 2, the first support member 105 of the front wheel support arm member 47 is pulled by hand as shown by chain double-dashed lines (in the direction of arrow a3) to draw the engaging shaft 66 engaged by the tension spring 65 out of the fourth engaging depressed portion 94 against the tension spring 65 to make it rotatable (in the directions of arrow a2). Then, the engaging shaft 66 is engaged with the first engaging depressed portion 91 at the desired lifted or lowered height, for example. This completes the setting of the lifted or lowered height.

The engagement of the engaging shaft 66 with the first engaging depressed portion 91 provides the selection of the lifted or lowered height of the front wheel 32.

FIG. 8 shows the guard member 34 shown in FIG. 4.

The guard member 34 includes the dirt guide plate 74. The dirt guide plate 74 includes a left plate 112 provided leftward of the central axis C2, and a right plate 113 continuous with the left plate 112. The right plate 113 is similar in shape to the left plate 112.

The dirt guide plate 74 catches dirt thrown up by the rotary working portions 15 and 16 (see FIG. 1), causing the thrown-up dirt to be broken into pieces by the impact of hitting the dirt guide plate 74 and fall onto the ground, such as a farm field that is being tilled. At that time, part of the falling dirt enters the space between the left plate member 71 and the right plate member 72 in FIG. 3.

The connection portion 56 includes a mounting portion 114 to which the flanges 62, 62 of the side plate member 53 (see FIG. 3) are attached, reinforcing portions 115, 115 formed continuously with the mounting portion 114, and two holes 116, 116 formed in the mounting portion 114.

The reinforcing plate 76 is formed with internal threads 117, 117 for mounting the fender 35 (see FIG. 1).

The reinforcing plate 76 is formed integrally continuously with the proximal portions 55. It is also possible to form the dirt guide plate 74 continuously with the proximal portions 55. Blank layouts, dividing positions and welding positions for obtaining the dirt guide plate 74, the proximal portions 55, the reinforcing plate 76 and the connection portion 56 can be determined desirably.

Next, the operation of the above-described front rotary working machine 10 will be described with reference to FIGS. 1, 2, 4 and 9.

In the front rotary working machine 10, when a load F is applied from the front wheel 32 to the support device 31, the load F is transmitted from the connected portions 51 of the side plate member 53 to the transmission case 27, being distributed as shown by arrows f1 and f2, and also simultaneously transmitted from the upper portion 45 of the side plate member 53 to the guard member 34 as shown by arrow f3, resultantly being distributed at three points. This can increase the strength of the support device 31 supporting the front wheel 32 as compared to a structure of supporting it on the transmission case 27 at a single point (e.g., at the point of the bolt 58 shown in FIG. 2). Also, elastic deformation of the support device 31 supporting the front wheel 32 can be prevented, resulting in the stability of the lifted or lowered height H of the front wheel 32 and the exact plowing depth D.

The support device 31 has the side plate member 53 having the openings 52 at the connected portions 51 to the transmission case 27, so that dirt 121 thrown up by the rotary working portions 15 and 16 as shown by arrow a4 and then hitting the dirt guide plate 74 of the guard member 34 and falling can be gravitationally discharged through the openings 52 as shown by arrow a5, being prevented from accumulating on the side plate member 53. This facilitates washing, inspection and maintenance of the support device 31.

The support device 31 is provided with the first to sixth engaging depressed portions 91 to 96 (see FIG. 6A). The selection of the first engaging depressed portion 91 sets the lifted or lowered height H of the front wheel 32 at h1 (minimum). The selection of the sixth engaging depressed portion 96 sets the lifted or lowered height H at h6 (maximum). When the lifted or lowered height H of the front wheel 32 is set at h1, the front rotary working machine 10 can be supported by the front wheel 32 for travel when not working. Setting in one of the second to sixth engaging depressed portions 92 to 96 enables setting of the plowing depth D when working.

Obviously, various minor changes and modifications of the present invention are possible in the light of the above teaching. It is therefore to be understood that within the scope of the appended claims the invention may be practiced otherwise than as specifically described.

What is claimed is:

1. A front rotary working machine for tilling the ground as the working machine travels along the ground, the working machine comprising:
   an engine;
   a transmission case mounted to a lower portion of the engine;
   rotary working portions disposed at a front portion of the transmission case and connected to be rotationally driven by the engine to till the ground as the working machine travels along the ground;
   a guard member extending forward from the transmission case for guarding an upper side of the rotary working portions, the guard member having a dirt guide plate that extends outwardly above the rotary working portions so that dirt thrown up by the rotary working portions strikes the dirt guide plate and breaks into smaller pieces that fall onto the ground; and
   a support device connected to the front portion of the transmission case for supporting a front wheel disposed forwardly of the rotary working portions, the support device having an upper portion connected to the guard member, a front wheel support arm member supporting the front wheel at a distal end portion thereof, and a side plate member rotatably supporting the front wheel support arm member and having an opening at a connected portion to the transmission case, the opening being located to allow the dirt to be gravitationally discharged therethrough without accumulating on the side plate member as the dirt falls onto the ground after striking the dirt guide plate.

2. A front rotary working machine according to claim 1; wherein the rotary working portions comprise left and right rotary working portions positioned at opposite sides of the working machine, and the dirt guide plate comprises left and right plates extending outwardly above respective ones of the left and right rotary working portions.

3. A front rotary working machine according to claim 2; wherein the side plate member comprises left and right plate members connected together in opposed relation and connected at upper portions thereof to the guard member.

4. A front rotary working machine according to claim 3; wherein the opening in the side plate member comprises an opening in each of the left and right plate members.

5. A front rotary working machine according to claim 3; wherein the front wheel support arm member extends between the left and right plate members and is rotatably supported on a support member that extends between the left and right plate members.

6. A working machine for tilling the ground, comprising: an engine that produces a rotary output; a transmission having a transmission case mounted to a lower portion of the engine; left and right rotary working portions disposed at a front portion of the transmission case on left and right sides of the working machine and connected to the transmission to be rotationally driven by the rotary output of the engine to till the ground as the working machine travels along the ground; a guard member extending forward from the transmission case and having left and right dirt guide plates that extend outward from the left and right sides of the working machine at locations above the left and right rotary working portions so that dirt thrown up by the rotary working portions strikes the dirt guide plates and breaks into smaller pieces that fall to the ground; a front wheel support member having front and rear end portions; a front wheel rotatably supported at the front end portion of the front wheel support member; and left and right plate members connected together in opposed relation and connected at upper portions thereof to the guard member and at rear portions thereof to the transmission case, the rear end portion of the front wheel support member extending between and being rotatably supported by the left and right plate members.

7. A working machine according to claim 6;
wherein the left and right plate members have openings configured and located to allow thrown-up dirt, after striking the left and right dirt guide plates, to fall through the openings to the ground.

8. A working machine according to claim 7;
wherein the openings are defined by concave peripheral edges of the left and right plate members.

9. A working machine according to claim 8;
wherein the rear portions of the left and right plate members are connected to the transmission case at locations that are adjacent the concave peripheral edges.

* * * * *